Figure 1:
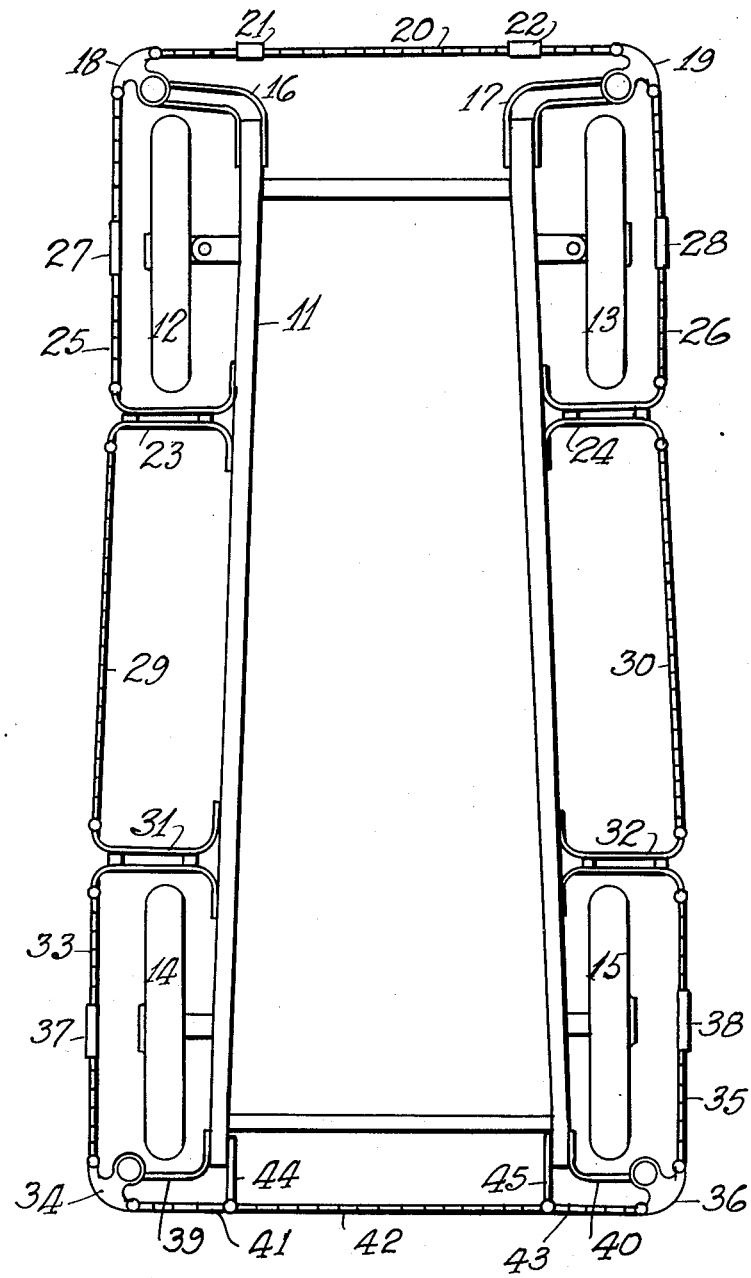

Oct. 5, 1926. 1,601,867

M. H. LOUGHRIDGE

AUTOMOBILE BUMPER AND WHEEL GUARD

Filed August 21, 1925    2 Sheets-Sheet 1

INVENTOR.

M. H. Loughridge

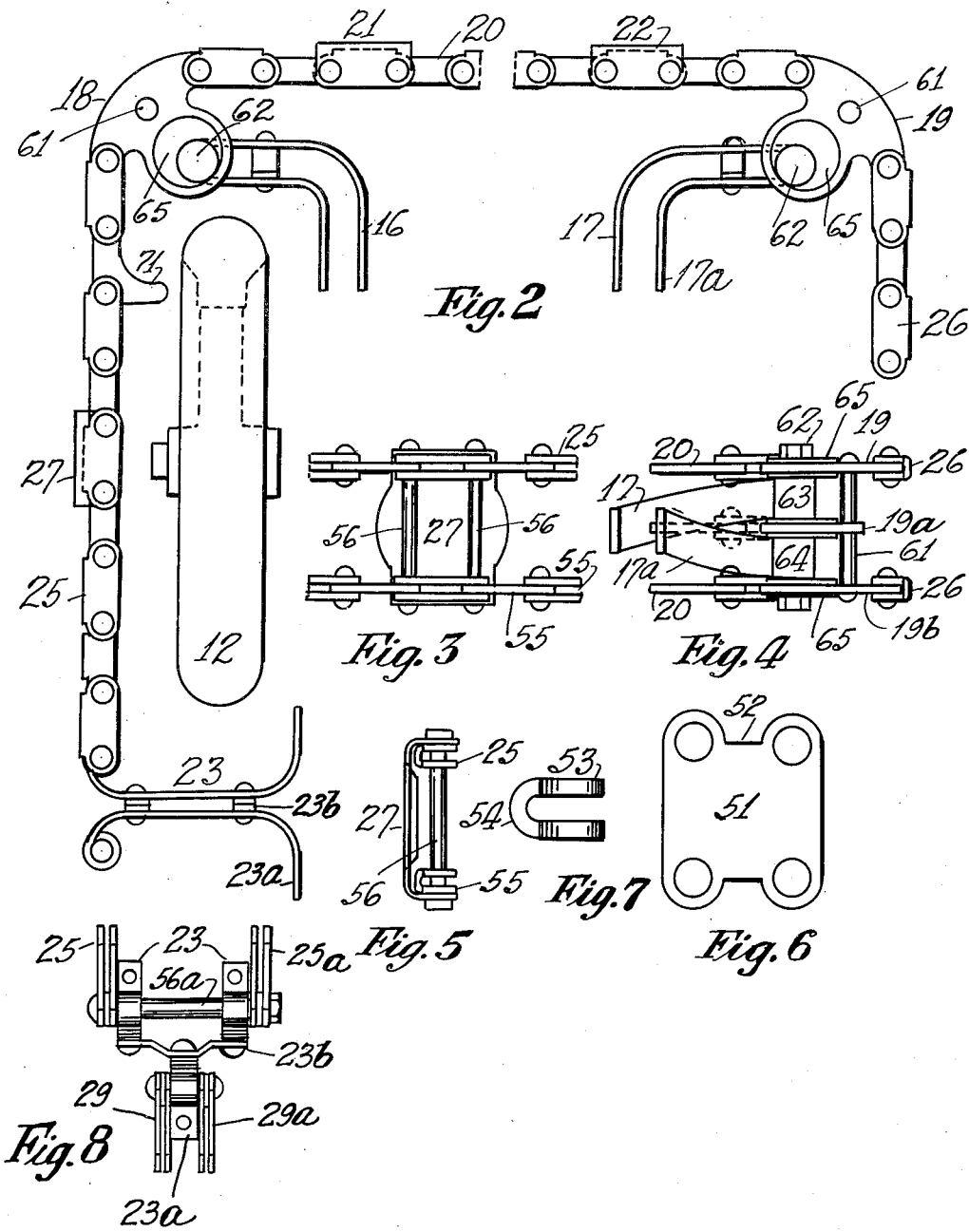

Patented Oct. 5, 1926.

1,601,867

UNITED STATES PATENT OFFICE.

MATTHEW H. LOUGHRIDGE, OF BOGOTA, NEW JERSEY, ASSIGNOR OF ONE-HALF TO HARRY W. DYER, OF NEW YORK, N. Y.

AUTOMOBILE BUMPER AND WHEEL GUARD.

Application filed August 21, 1925. Serial No. 51,670.

This invention relates to automobile bumpers and wheel guards and has for an object to provide a protection for automobiles which may be applied around the wheels and the sides as well as on the front and rear of the car, a further object of the invention is to provide a flexible guard around the car which distributes the impact and another object of the invention is the adaption of a flat type of chain guard for this purpose. These and other objects of the invention will be understood from the following specification and the accompanying drawings, in which, Fig. 1, is a plan view of an automobile chassis showing the chain guard in place, Fig. 2 is a plan view showing the details of construction, Fig. 3 shows a guard plate supported by the chains, Fig. 4 is an elevation of the corner construction, Fig. 5 is an elevation corresponding to Fig. 3, Fig. 6 is a blank form of a chain link, Fig. 7 shows the link after it is formed to shape and Fig. 8 is an elevation of one of the side brackets.

The present invention contemplates the use of a flat chain arranged to receive the thrust on its edge to be used as an impact bar and suitably supported by brackets around the vehicle. The preferred construction embodies at least a pair of chains placed parallel in spaced relation with a guard plate secured at intervals between said chains to increase the effective area of the chains. The brackets comprise a motion plate working on a pivot and rounded at the corners. The ends of the chain are secured to this motion plate and extend at right angles therefrom so that a thrust or impact against one part of the chain is distributed to the other parts. An eccentric adjustment is provided in the pivots of the motion plates whereby the tension on the chain can readily be adjusted; and the wheel guards can be slackened and released at one of the brackets thereby making the wheel accessible for renewing tires. The links of the chain are punched from flat stock and are bent over forming a rounded edge to receive the impact.

Referring to the drawings, in the general outline in Fig. 1, 11 is the chassis of the automobile, 12 and 13 are the front wheels and 14 and 15 are the rear wheels. 16 and 17 are the front brackets, the bracket 16 supporting the motion plate 18 which is rounded to form the corner of the guard as shown and the bracket 17 supports the motion plate 19 on the opposite corner which is similar to 18. Between the motion plates 18 and 19 the chain impact member 20 is secured and to this chain at intervals, the guard plates 21 and 22 are secured.

In rear of the front wheel 12 a side bracket 23 is located projecting beyond the wheel so as to provide space in which the wheel may turn for steering purposes. Secured between this bracket and the corner plate 18 is the chain guard 25 which supports the guard plate 27 directly opposite the hub of wheel 12. On the opposite side a corresponding bracket 24 is provided with a wheel guard 26 extending from this bracket to the corner plate 19 and supporting a guard plate 28 opposite the hub of wheel 13.

Another side bracket 31 is provided in front of the rear wheel 14 corresponding to bracket 23 and between these brackets the chain guard 29 is secured, and on the opposite side a bracket 32 is provided corresponding with bracket 24 and between these brackets the chain guard 30 is secured. The chain guards 29 and 30 protect the sides of the car opposite the running boards.

A rear bracket 39 supports the corner plate 34 and between this plate and bracket 31 the wheel guard 33 is secured which supports the guard plate 37 opposite the hub of wheel 14. Similarly, on the opposite side, the bracket 40 supports the corner plate 36 and between this plate and bracket 32 the chain guard 35 is secured having a guard plate 38 opposite the hub of wheel 15.

On the rear of the vehicle a chain guard 41, 42 and 43 is provided between the corner plates 34 and 36. This chain is supported by the additional brackets 44 and 45 and it should be noted that the chain 42 may be omitted to provide space for tires on the rear of the vehicle, or may be moved back from the plane of chains 41 and 43.

The chain is constructed as shown in Figs. 6 and 7. The blank 51 is cut away at 52 so that when bent to bring the opposing sides opposite, a link is formed having a rounded front 54 and rounded ends at 53. Adjacent links are connected by a plain rectangular bar passing between the jaws of the link and riveted in place. The chain links are also connected to their supports in the same manner. This provides a chain impact member of flat construction with its edge arranged to receive the impact and with the links of this edge rounded so as to eliminate sharp edges and prevent injury to the object engaged. A chain of this type has unusual strength, will distribute the impact and is easily replaced and stored.

Around the ends and the wheels of the car the chain guard is provided at least in duplicate sections spaced in parallel relation one above the other. This doubles the effective resistance of the guard and enables advantage to be taken of the area between the chains for receiving an impact. For this purpose guard plates are provided extending between the chains at intervals so that a chain guard or automobile bumper of another car will engage these plates and thereby distribute the impact between the chains. These guard plates may be arranged as in Fig. 3 and Fig. 5. The plate 27 is turned over at the ends to engage the links of the two chains 25 and 55 and the through bolts 56 form the pivots for the chain and the securing means for holding the plates in place.

The corner bracket comprises the arms 17 and 17ª Fig. 2 secured to the chassis frame and curving outwardly to bring the guard beyond the clearance line of the vehicle. These arms are formed into eyes at 63 and 64, Fig. 4 through which the post 62 passes carrying the eccentric discs 65. On the discs 65 the corner plates 19 are pivotally mounted. In Fig. 4 three plates are shown arranged to support three chains in front of the vehicle and two chains 26 at the side of the vehicle. These plates may be connected to move together on their pivots by the bolt 61.

The guard at the side of the vehicle must be comparatively narrow so as not to interfere with the running board or form an obstruction on entering the car. This guard therefore may be composed of one chain or two chains placed closely together. For this purpose the side brackets as shown in Fig. 8 comprise the members 23 and 23ª connected by the cross braces 23ᵇ. The members 23 are spaced according to the spacing of the chains 25 guarding the wheels while the member 23ª has a single eye for the connections of chains 29—29ª which are thus spaced closely together.

A certain amount of tension is necessary in order to prevent the chain from rattling and to hold it in alignment, also, it is necessary to be able to slacken the chain so that part of it may be disconnected, as for instance disconnecting the wheel guard from the side bracket when changing a tire. For this purpose the eccentric adjustment in the discs 65 is provided. These discs are rotated until the desired tension is secured when they are clamped in place by the bolts 62. When the guard is to be slackened the eccentrics are rotated to bring the corner plate towards the centre of the car and it will be noted that both of the corner plates may be adjusted in this way so that the slack may be accumulated on the guard at one side. When slackened the pin 56ª may be removed from the side bracket thereby exposing the entire wheel.

One of the most frequent forms of accident is side swipes which the present style of bumpers cannot safeguard. In these accidents the wheel is often injured and the axle bent as well as minor injuries to the mud guards and other parts. With this invention the impact of a side swipe is taken up by the wheel guards and deflected towards the end of the vehicle where the rounded corners prevent it from engaging or locking the vehicles together. The guard plate over the hub prevents the wheel axle from being injured and the chain as it is deflected by the impact may be arranged to engage the rim of the wheel after an initial deflection. For this purpose extension links 71 on the chain may be provided aligning with the wheel rim so that upon extreme deflection the chain engages and is supported by the wheel rim and does not injure the tire.

A chain bumper of this type is noiseless, cannot be dented, and with pivoted supporting plates distributes the impact throughout the bumper. It is apparent that in applying this invention, it will be applied to suit the conditions of service and may be applied in unit parts to any extent desired.

Having thus described my invention, I claim:

1. In an automobile bumper of the class described, the combination on an impact member, a pair of brackets secured to said automobile and an eccentric connection between said brackets and said impact member.

2. In an automobile bumper of the class described, the combination of an impact member, a pair of brackets secured to said automobile, a plate secured to each bracket having a rounded contour forming the limits of the bumper, said impact member pivotally secured to said plates.

3. In an automobile bumper of the class described, the combination of an impact member, a pair of brackets secured to said automobile, a plate having a rounded contour pivotally secured to said brackets and forming the limits of the bumper and said impact member secured to said plates.

4. In an automobile guard of the class described, the combination of a plurality of impact members extending at right angles to each other, a bracket secured to said automobile, a plate with a rounded contour supported by said bracket, said impact members supported by said plate and said plate forming the corner of said guard.

5. In an automobile guard of the class described, the combination of a plurality of impact members extending at right angles to each other, a bracket secured to said automobile, a plate pivotally supported by said bracket and forming the corner of said guard and said impact members pivotally secured to said plate.

6. In an automobile bumper of the class described, the combination of a plurality of impact members arranged one above the other, a pair of brackets secured to said automobile, a plurality of plates placed one above the other secured to each of said brackets and said impact members pivotally secured to said plates.

7. In an automobile bumper of the class described, the combination of a plurality of impact members extending at right angles to each other, a bracket secured to said automobile, a plate adjustably secured by said bracket and said impact members secured to said plate.

8. In an automobile guard of the class described, the combination of a plurality of impact members extending at right angles to each other, a side bracket secured to said automobile between the wheels and a pivoted member secured to the end of the automobile, one of said impact members secured to said bracket and to said pivoted member.

9. In an automobile bumper of the class described, the combination of a flexible impact member, a pair of brackets secured to said automobile and supporting said impact member and an eccentric embodied in said brackets for adjusting the tension on said impact member.

10. In an automobile bumper of the class described, the combination of a flexible impact member, a pair of brackets secured to said automobile, a plate having a rounded contour secured to each of said brackets and forming the limits of said bumper and said flexible impact member pivotally secured to said plates.

11. In an automobile bumper of the class described, the combination of a pair of rigid brackets and a pair of pivoted bracket members with flexible impact members extending between said rigid brackets and said pivoted brackets.

12. In an automobile guard of the class described, the combination of rigid brackets on the sides of said automobile and pivoted bracket members at each corner of the automobile and flexible impact members connected between said brackets and bracket members.

13. In an automobile guard of the class described, the combination of rigid brackets and pivoted bracket members with flexible impact members connected between said brackets and said bracket members and an eccentric adjustment associated with said bracket members.

14. In an automobile wheel guard of the class described, the combination of a pair of impact members placed one above the other, brackets for supporting said members diametrically in front of the wheel and a guard plate extending between said members in front of the hub of said wheel.

15. In an automobile wheel guard of the class described, the combination of an impact member placed diametrically in front of the wheel, brackets secured to the automobile supporting said member and means on said member for engaging the rim of the wheel when it is displaced by an impact.

16. In an automobile wheel guard of the class described, the combination of a plurality of flexible impact members placed horizontally one above the other, brackets secured to the automobile supporting said members in front of and spaced from the wheel, and a guard for the hub of said wheel supported by said impact members.

17. In an automobile bumper of the class described, the combination of a plurality of chain impact members placed horizontally one above the other, means for supporting said impact members in front of the automobile and guard plates extending between said members and secured through the pivots of said chain.

18. In an automobile bumper of the class described, the combination of a plurality of flexible flat impact members with the flat side horizontal placed one above the other and a guard plate extending between said members and having its ends turned over to engage the flat side of said members.

19. An automobile bumper of the class described comprising a flat chain member with the flat side horizontal as an impact member.

20. An automobile bumper of the class described comprising a flat flexible member as an impact member with the flat side horizontal.

21. An automobile bumper of the class described comprising a flat chain member arranged to receive an impact on its edge the said edge being rounded.

22. An automobile bumper of the class described comprising an impact chain member having overlapping pivotally connected links made from flat stock with the flat portion of said links placed horizontal.

23. An automobile bumper of the class described comprising an impact chain member, the links of said chain being made from flat stock with their flat sides placed horizontally and their ends overlapping and pivotally connected together.

24. An automobile bumper of the class described comprising an impact chain member, part of the links of said chain being made from flat stock bent upon itself to form a jaw and engaging a member in said jaw.

25. An automobile guard of the class described comprising an impact chain member with overlapping pivotally connected links and guard members secured to said chain by the pivots of said links.

26. In an automobile guard of the class described, the combination of a plurality of rigid brackets and a pivoted bracket secured to said automobile and a flexible impact member extending between said brackets.

27. In an automobile guard of the class described, the combination of a plurality of rigid brackets secured to the sides of the automobile and pivoted bracket members secured to the ends of the automobile and a flexible impact member extending between said brackets and bracket members.

28. In an automobile bumper bracket, the combination of a pair of members for securing to the frame of the automobile, said members formed in eyes at the outer end and said eyes placed in vertical alignment.

29. An automobile bumper bracket comprising a pair of spaced members for securing to the frame of the automobile, said members projecting from the frame and braced together independently of the bumper connection and terminating in means connecting with the impact member of the bumper.

30. An automobile bumper bracket comprising a pair of opposed spaced members for securing to the frame of the automobile and projecting from the frame, said members connected together independently of the bumper connection and formed with means connecting with impact members of the bumper extending in opposite directions.

Signed at New York, N. Y. this 24th day of Feby. 1925.

MATTHEW H. LOUGHRIDGE.